United States Patent
Haga et al.

(10) Patent No.: US 12,028,353 B2
(45) Date of Patent: Jul. 2, 2024

(54) THREAT ANALYSIS APPARATUS, THREAT ANALYSIS METHOD, AND RECORDING MEDIUM

(71) Applicant: Panasonic Intellectual Property Corporation of America, Torrance, CA (US)

(72) Inventors: Tomoyuki Haga, Nara (JP); Takamitsu Sasaki, Osaka (JP); Hajime Tasaki, Osaka (JP); Hideki Matsushima, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 483 days.

(21) Appl. No.: 17/211,211

(22) Filed: Mar. 24, 2021

(65) Prior Publication Data

US 2021/0211442 A1    Jul. 8, 2021

Related U.S. Application Data

(63) Continuation of application No. PCT/JP2019/039831, filed on Oct. 9, 2019.
(Continued)

(51) Int. Cl.
| | | |
|---|---|---|
| *H04L 9/40* | (2022.01) | |
| *G06F 21/57* | (2013.01) | |
| *H04W 12/122* | (2021.01) | |

(52) U.S. Cl.
CPC ...... *H04L 63/1416* (2013.01); *H04L 63/1425* (2013.01)

(58) Field of Classification Search
CPC .......... H04L 63/1416; H04L 63/1425; H04W 12/122; G06F 21/57
See application file for complete search history.

(56) References Cited

U.S. PATENT DOCUMENTS

| | | | |
|---|---|---|---|
| 9,946,531 B1 * | 4/2018 | Fields | ...................... G07C 5/02 |
| 2018/0063171 A1 | 3/2018 | Yamada et al. | |

(Continued)

FOREIGN PATENT DOCUMENTS

JP    2018-32354    3/2018

OTHER PUBLICATIONS

IoTRiskAnalyzer: A Probabilistic Model Checking Based Framework for Formal Risk Analytics of the Internet of Things by Mohsin (Year: 2017).*

(Continued)

*Primary Examiner* — Vu V Tran
(74) *Attorney, Agent, or Firm* — Wenderoth, Lind & Ponack, L.L.P.

(57) ABSTRACT

A threat information analysis server includes: an update manager that manages update information indicating that function addition to an IoT device is performed; a threat information manager that stores threat information of a cyberattack; a risk level manager that manages risk level information defining a risk level of the IoT device; a related threat information manager that manages the threat information and related threat information associating the IoT device with the risk level; a risk level updater that associates the threat information and the risk level of the IoT device with each other and updates the related threat information, based on the update information; and an outputter that outputs the related threat information managed by the related threat information manager.

12 Claims, 17 Drawing Sheets

Related U.S. Application Data

(60) Provisional application No. 62/746,842, filed on Oct. 17, 2018.

(56) References Cited

U.S. PATENT DOCUMENTS

| | | | | |
|---|---|---|---|---|
| 2018/0302228 | A1* | 10/2018 | Hergesheimer | H04L 9/3247 |
| 2018/0349612 | A1* | 12/2018 | Harel | G06F 11/0793 |
| 2018/0351980 | A1* | 12/2018 | Galula | H04L 63/1416 |
| 2019/0190926 | A1* | 6/2019 | Choi | H04L 63/1425 |
| 2019/0215339 | A1* | 7/2019 | Chen | H04L 63/02 |

OTHER PUBLICATIONS

International Search Report (ISR) dated Dec. 24, 2019 in International (PCT) Application No. PCT/JP2019/039831.
Extended European Search Report issued Feb. 28, 2024 in corresponding European Patent Application No. 24152273.9.
Masashi Eto, NICT, Japan, "Update for draft Recommendation of Secure software update capability for ITS communications devices (X.itssec-1)", ITU—Telecommunication Standardization Sector, Study Period 2013-2016, Study Group 17, vol. 6/17, Jul. 2015, pp. 1-24, XP044151323.

\* cited by examiner

FIG. 5

| AUTOMATIC DRIVING LEVEL | FUNCTION OF VEHICLE | RISK LEVEL |
|---|---|---|
| 0 | BLIND SPOT DETECTION | 1 |
| 1 | ADAPTIVE CRUISE CONTROL | 2 |
| | LANE DEPARTURE PREVENTION | 2 |
| | AUTOMATIC BRAKING | 2 |
| 2 | CONGESTION FOLLOWING | 3 |
| | PARKING ASSISTANCE | 3 |
| | AUTOMATIC LANE CHANGE | 3 |
| | CUT-IN DECELERATION | 3 |
| | LANE CENTERING | 3 |
| 3 | HIGH-SPEED FOLLOWING | 4 |
| | OVERTAKING | 4 |
| | MERGING/BRANCHING | 4 |
| | SHARP-CURVE AUTOMATIC TRAVELING | 4 |
| | MAIN LANE DEPARTURE | 4 |
| | EMERGENCY PULLOVER | 4 |
| | AUTOMATIC PARKING | 4 |
| 4 | STOP/START AT TRAFFIC LIGHT | 5 |
| | PEDESTRIAN/BICYCLE AVOIDANCE | 5 |
| | OBSTACLE AVOIDANCE | 5 |
| | SLOWDOWN AS NEEDED | 5 |
| | RIGHT OR LEFT TURN/STOP/ENTRY AT INTERSECTION | 5 |
| | TRAVELING ACCORDING TO TRAFFIC SIGNS | 5 |
| | ONCOMING VEHICLE AVOIDANCE | 5 |
| | LARGE VEHICLE IDENTIFICATION | 5 |
| | NARROW ROAD TRAVELING | 5 |
| 5 | STOP/START AT TRAFFIC LIGHT | 6 |
| | PEDESTRIAN/BICYCLE AVOIDANCE | 6 |
| | OBSTACLE AVOIDANCE | 6 |
| | SLOWDOWN AS NEEDED | 6 |
| | RIGHT OR LEFT TURN/STOP/ENTRY AT INTERSECTION | 6 |
| | TRAVELING ACCORDING TO TRAFFIC SIGNS | 6 |
| | ONCOMING VEHICLE AVOIDANCE | 6 |
| | LARGE VEHICLE IDENTIFICATION | 6 |
| | NARROW ROAD TRAVELING | 6 |

| | | ECU MANUFACTURER A | | | ECU MANUFACTURER B | | SENSOR MANUFACTURER | | | TCU | RISK LEVEL |
|---|---|---|---|---|---|---|---|---|---|---|---|
| | | ECU_A1 | ECU_A2 | ECU_A3 | ECU_B1 | ECU_B2 | CAMERA | LiDAR | RADAR | REMOTE CONTROL | |
| ECU MANUFAC- TURER A | ECU_A1 Version1.0 (ACC) | / | | | | ✓ | | | ✓ | | 3 |
| | ECU_A2 Version2.0 (LANE DEPARTURE PREVENTION) | | / | | | | ✓ | | | | 2 |
| | ECU_A3 Version1.0 (PARKING ASSISTANCE) | ✓ | | / | | | ✓ | ✓ | | | 4 |
| | Version2.0 (AUTOMATIC PARKING) | ✓ | ✓ | / | | | ✓ | ✓ | ✓ | | 5 |
| ECU MANUFAC- TURER B | ECU_B1 Version1.0 (AUTOMATIC PARKING) | ✓ | ✓ | ✓ | / | ✓ | ✓ | ✓ | ✓ | | 7 |
| | Version2.0 (AUTOMATIC PARKING) | ✓ | ✓ | ✓ | / | ✓ | ✓ | ✓ | ✓ | ✓ | 7 |
| | ECU_B2 Version4.0 (AUTOMATIC DRIVING) | ✓ | ✓ | ✓ | | / | ✓ | ✓ | ✓ | ✓ | 8 |

| APPLICATION SUPPLIER | APPLICATION ID | SOFTWARE VERSION | FUNCTION OF APPLICATION | AUTHORITY OF APPLICATION | | | | | | | RISK LEVEL |
|---|---|---|---|---|---|---|---|---|---|---|---|
| | | | | BRAKE OPERATION | STEERING OPERATION | ACCELERATOR OPERATION | CAMERA | RADAR | LiDAR | TCU | |
| SUPPLIER A | APPLICATION A1 | 1.0 | BLIND SPOT DETECTION | | | | ✓ | | | | 1 |
| | APPLICATION A2 | 1.0 | LANE DEPARTURE PREVENTION | | ✓ | | ✓ | ✓ | | | 3 |
| | APPLICATION A3 | 1.0 | AUTOMATIC BRAKING | ✓ | | | ✓ | ✓ | | | 3 |
| | APPLICATION A3 | 1.0 | PARKING ASSISTANCE | | ✓ | ✓ | ✓ | | | | 3 |
| | APPLICATION A3 | 2.0 | AUTOMATIC PARKING | ✓ | ✓ | ✓ | ✓ | ✓ | | | 5 |
| | APPLICATION A4 | 1.0 | CONGESTION FOLLOWING | | ✓ | ✓ | ✓ | ✓ | | | 4 |
| SUPPLIER B | APPLICATION B1 | 1.0 | CONGESTION FOLLOWING | ✓ | ✓ | ✓ | | ✓ | | | 3 |
| | APPLICATION B2 | 1.0 | AUTOMATIC DRIVING | ✓ | ✓ | ✓ | ✓ | ✓ | ✓ | | 6 |
| SUPPLIER C | APPLICATION C1 | 1.0 | AUTOMATIC DRIVING | ✓ | ✓ | ✓ | ✓ | ✓ | ✓ | ✓ | 7 |

FIG. 8

| THREAT INFORMATION ID | FUNCTION | | | | ECU_ID | | | APPLICATION ID | | |
|---|---|---|---|---|---|---|---|---|---|---|
| | ACC | LANE DEPARTURE PREVENTION | PARKING ASSISTANCE | AUTOMATIC ASSISTANCE | ... | ECU_A1 | ECU_A2 | ECU_A3 | APPLICATION A1 | APPLICATION A2 | APPLICATION A3 |
| THREAT INFORMATION 001 | ✓ | | | | | ✓ | | | | | |
| THREAT INFORMATION 002 | | ✓ | | | | | ✓ | | | | |
| THREAT INFORMATION 003 | | | ✓ | | | | | ✓ | | | ✓ |
| THREAT INFORMATION 010 | | | | ✓ | | | | ✓ | ✓ | | ✓ |
| THREAT INFORMATION 020 | | | | ✓ | | | | ✓ | ✓ | ✓ | ✓ |

| AUTOMOBILE MANUFACTURER | VEHICLE TYPE | FUNCTION | ECU ID | RISK LEVEL | RELATED THREAT INFORMATION |
|---|---|---|---|---|---|
| OEM_A | MODEL_A1 | ACC | ECU_A1 | 2 | THREAT INFORMATION 001 |
| | | LANE DEPARTURE PREVENTION | ECU_A2 | 2 | THREAT INFORMATION 002 |
| | | PARKING ASSISTANCE | ECU_A3 | 3 | THREAT INFORMATION 003 |
| | MODEL_A2 | AUTOMATIC BRAKING | ECU_C1 | 2 | THREAT INFORMATION 004 |
| | | CONGESTION FOLLOWING | ECU_C2 | 3 | THREAT INFORMATION 005 |
| | | AUTOMATIC LANE CHANGE | ECU_C3 | 3 | THREAT INFORMATION 006 |
| OEM_B | MODEL_B1 | ACC | ECU_D1 | 2 | THREAT INFORMATION 001 |
| | | AUTOMATIC BRAKING | ECU_D2 | 2 | THREAT INFORMATION 004 |
| | | LANE DEPARTURE PREVENTION | ECU_D3 | 2 | THREAT INFORMATION 002 |

| AUTOMOBILE MANUFACTURER | VEHICLE TYPE | FUNCTION | ECU ID | RISK LEVEL | RELATED THREAT INFORMATION |
|---|---|---|---|---|---|
| OEM_A | MODEL A1 | ACC | ECU_A1 | 2 | THREAT INFORMATION 001 |
| | | LANE DEPARTURE PREVENTION | ECU_A2 | 2 | THREAT INFORMATION 002 |
| | | PARKING ASSISTANCE | ECU_A3 | 3 | THREAT INFORMATION 003 |
| | | AUTOMATIC BRAKING | ECU_A3 | 4 | THREAT INFORMATION 010, THREAT INFORMATION 020 |
| | MODEL A2 | AUTOMATIC BRAKING | ECU_C1 | 2 | THREAT INFORMATION 004 |
| | | CONGESTION FOLLOWING | ECU_C2 | 3 | THREAT INFORMATION 005 |
| | | AUTOMATIC LANE CHANGE | ECU_C3 | 3 | THREAT INFORMATION 006 |
| OEM_B | MODEL B1 | ACC | ECU_D1 | 2 | THREAT INFORMATION 001 |
| | | AUTOMATIC BRAKING | ECU_D2 | 2 | THREAT INFORMATION 004 |
| | | LANE DEPARTURE PREVENTION | ECU_D3 | 2 | THREAT INFORMATION 002 |

| AUTOMOBILE MANUFACTURER | VEHICLE TYPE | FUNCTION | RELATED ECU | RISK LEVEL | RELATED THREAT INFORMATION |
|---|---|---|---|---|---|
| OEM_A | MODEL A1 | AUTOMATIC PARKING NEW | ECU_A3 | HIGH | THREAT INFORMATION 010, THREAT INFORMATION 020 |
| | | PARKING ASSISTANCE | ECU_A3 | MEDIUM | THREAT INFORMATION 003 |
| | | LANE DEPARTURE PREVENTION | ECU_A2 | MEDIUM | THREAT INFORMATION 002 |
| | | ACC | ECU_A1 | LOW | THREAT INFORMATION 001 |

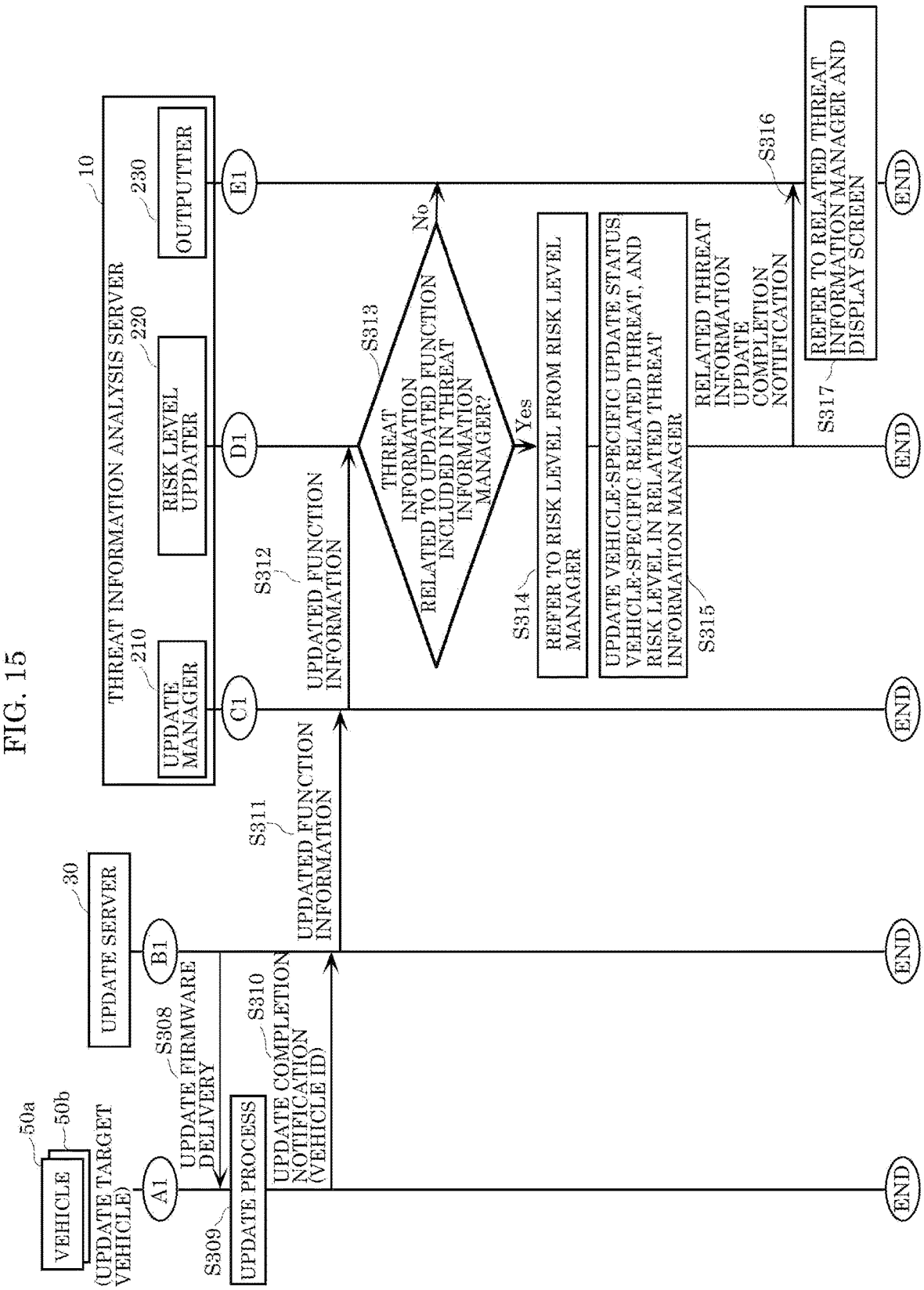

FIG. 16

| AUTOMOBILE MANUFACTURER | VEHICLE TYPE | VEHICLE TYPE ID | FUNCTION | ECU ID | ECU SOFTWARE VERSION | UPDATE STATUS | RISK LEVEL | RELATED THREAT INFORMATION |
|---|---|---|---|---|---|---|---|---|
| OEM_A | MODEL A1 | VID_A1 | ACC | ECU_A1 | Version1.0 | LATEST | 1 | THREAT INFORMATION 001 |
| | | | LANE DEPARTURE PREVENTION | ECU_A2 | Version1.0 | LATEST | 1 | THREAT INFORMATION 002 |
| | | | PARKING ASSISTANCE | ECU_A3 | Version1.0 | NOT UPDATED | 2 | THREAT INFORMATION 003 |
| | | VID_A2 | ACC | ECU_A1 | Version1.0 | LATEST | 1 | THREAT INFORMATION 001 |
| | | | LANE DEPARTURE PREVENTION | ECU_A2 | Version1.0 | LATEST | 1 | THREAT INFORMATION 002 |
| | | | PARKING ASSISTANCE | ECU_A3 | Version2.0 | LATEST | 2 | THREAT INFORMATION 003 |
| | | | AUTOMATIC PARKING | ECU_A3 | Version2.0 | LATEST | 4 | THREAT INFORMATION 010, THREAT INFORMATION 020 |

FIG. 17

| AUTOMOBILE MANUFACTURER | VEHICLE TYPE | VEHICLE TYPE ID | FUNCTION | ECU ID | VERSION | RISK LEVEL | RELATED THREAT INFORMATION |
|---|---|---|---|---|---|---|---|
| OEM_A | MODEL_A1 | VID_A1 | PARKING ASSISTANCE | ECU_A3 | Ver.1.0 | MEDIUM | THREAT INFORMATION 003 |
| | | | LANE DEPARTURE PREVENTION | ECU_A2 | Ver.1.0 | LOW | THREAT INFORMATION 002 |
| | | | ACC | ECU_A1 | Ver.1.0 | LOW | THREAT INFORMATION 001 |
| | | VID_A2 | AUTOMATIC PARKING | ECU_A3 | Ver.2.0 | HIGH | THREAT INFORMATION 010, THREAT INFORMATION 020 |
| | | | PARKING ASSISTANCE | ECU_A3 | Ver.2.0 | MEDIUM | THREAT INFORMATION 003 |
| | | | LANE DEPARTURE PREVENTION | ECU_A2 | Ver.1.0 | LOW | THREAT INFORMATION 002 |
| | | | ACC | ECU_A1 | Ver.1.0 | LOW | THREAT INFORMATION 001 |

900, 812, 811

THREAT ANALYSIS APPARATUS, THREAT ANALYSIS METHOD, AND RECORDING MEDIUM

CROSS REFERENCE TO RELATED APPLICATIONS

This application is a U.S. continuation application of PCT International Patent Application Number PCT/JP2019/039831 filed on Oct. 9, 2019, claiming the benefit of priority of U.S. Provisional Patent Application No. 62/746,842 filed on Oct. 17, 2018, the entire contents of which are hereby incorporated by reference.

BACKGROUND

1. Technical Field

The present disclosure relates to a threat analysis apparatus, a threat analysis method, and a recording medium.

2. Description of the Related Art

For efficient analysis of cyberattacks against vehicles and the like, technology utilizing STIX (Structured Threat Information eXpression) which is a standardized format is available (see Japanese Unexamined Patent Application Publication No. 2018-32354 (PTL 1)).

SUMMARY

There is a problem in that, in the case where a new threat against a vehicle or the like occurs, it takes time to analyze the new threat. This problem can arise not only in vehicles but in a wide variety of IoT (Internet of Things) devices.

In view of this, the present disclosure provides a threat analysis apparatus that shortens the time from when an attack from a new threat is discovered to when the new threat is analyzed.

A threat analysis apparatus according to one aspect of the present disclosure includes: a processor; and a memory holding: information on an update manager that manages update information indicating that function addition to an IoT device is performed; information on a threat information manager that stores threat information of a cyberattack; information on a risk level manager that manages risk level information defining a risk level of the IoT device; and information on a related threat information manager that manages the threat information and related threat information associating the IoT device with the risk level; the memory further including at least one set of instructions that, when executed by the processor causes the processor to perform operations including; associating the threat information and the risk level of the IoT device with each other and updating the related threat information, based on the update information; and outputting the related threat information managed by the related threat information manager.

These general and specific aspects may be implemented using a system, a method, an integrated circuit, a computer program, or a computer-readable recording medium such as CD-ROM, or any combination of systems, methods, integrated circuits, computer programs, and recording media.

The threat analysis apparatus according to the present disclosure can shorten the time from when an attack from a new threat is discovered to when the new threat is analyzed.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 5 is an explanatory diagram illustrating an example of a function-specific risk level table held in a risk level manager in Embodiment 1;

FIG. 6 is an explanatory diagram illustrating an example of a related ECU-specific risk level table held in the risk level manager in Embodiment 1;

FIG. 7 is an explanatory diagram illustrating an example of an application authority-specific risk level table held in the risk level manager in Embodiment 1;

FIG. 8 is an explanatory diagram illustrating an example of a threat information database held in a threat information manager in Embodiment 1;

FIG. 9 is an explanatory diagram illustrating an example of a model-specific related threat information database held in a related threat information manager in Embodiment 1;

FIG. 10 is an explanatory diagram illustrating an example of the model-specific related threat information database after function addition by an update in Embodiment 1;

FIG. 14 is an explanatory diagram illustrating an example of a related threat information output screen after the update for function addition in Embodiment 1;

FIG. 15 is a sequence diagram illustrating a process of updating vehicle-specific related threat information in the case of function addition by an update in Embodiment 2;

FIG. 16 is an explanatory diagram illustrating an example of a vehicle-specific related threat information database in Embodiment 2; and FIG. 17 is an explanatory diagram illustrating an example of a vehicle-specific related threat information output screen in Embodiment 2.

Figure 1:
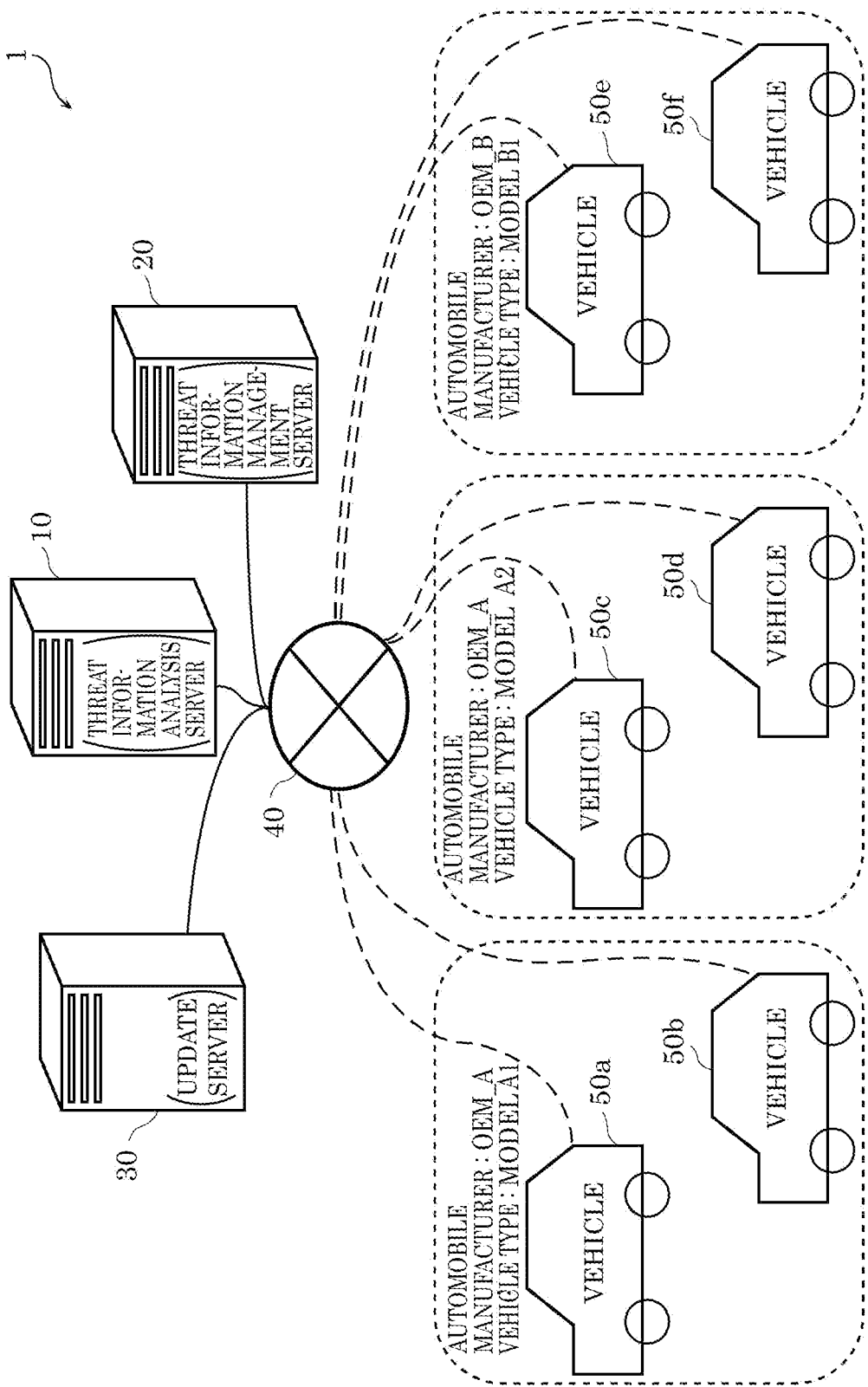
FIG. 1 is a schematic diagram illustrating a structure of a threat analysis system in Embodiment 1.

DETAILED DESCRIPTION OF THE EMBODIMENTS (Underlying Knowledge Forming Basis of the Present Disclosure)

The present inventor has found the following problem in relation to cyberattacks described in the Background Art section.

In recent years, the over-the-air (OTA) function of wirelessly updating software installed in automobiles is increasingly introduced in the field of connected cars which are automobiles connected to networks. The use of OTA provides automobile manufacturers with an advantage that recall costs can be considerably reduced. Moreover, automobile manufacturers can not only shorten the time of responding to cyberattacks and improve quality operating effectiveness but also strengthen functions of vehicle performance after shipment.

Meanwhile, when an automobile is connected to the Internet, the risk of cyberattacks against the automobile increases, as with personal computers, etc. In particular, in the case where open source software such as Linux® is used in an in-vehicle system or the software scale expands as a result of electrification functionality enhancement, it is difficult to completely eliminate all vulnerabilities before shipment, and a vulnerability is exploited to carry out a cyberattack after shipment.

Even when a vulnerability is discovered, it takes time to reflect a countermeasure against the vulnerability in the vehicle. There is a possibility of a cyberattack until the countermeasure is reflected. Hence, it is important to shorten the time until the countermeasure is reflected.

Since even a newly discovered cyberattack can exploit a known vulnerability or attack technique, an effective way of analyzing attacks is to refer to past attack instances or countermeasures. In view of this, for efficient cyberattack analysis, specifications wherein past cyberattack activities are written in STIX (Structured Threat Information eXpression) which is a standardized format and threat information is exchanged are defined.

There is a method of providing a similar cyberattack and analyzing the attack using STIX (PTL 1). However, with the method described in PTL 1, when a function of the vehicle is updated by OTA, threat information related to the updated function cannot be promptly presented.

With the software updated function in connected cars, functions strengthened after shipment are likely to gain attention and subjected to attacks. Attacks often exploit past vulnerabilities or attack techniques.

The present disclosure accordingly has the following object: By associating past threat information related to a new function added by a software update with the new function and promptly presenting it to a security analyst who carries out threat analysis, in the case where a cyberattack against the new function added by the software update is detected, the security analyst analyzes the attack by referring to the threat information associated with the new function, thus making the analysis efficient and shortening the time from discovering the attack to taking a countermeasure.

A threat analysis apparatus according to an aspect of the present disclosure includes: an update manager that manages update information indicating that function addition to an IoT device is performed; a threat information manager that stores threat information of a cyberattack; a risk level manager that manages risk level information defining a risk level of the IoT device; a related threat information manager that manages the threat information and related threat information associating the IoT device with the risk level; a risk level updater that associates the threat information and the risk level of the IoT device with each other and updates the related threat information, based on the update information; and an outputter that outputs the related threat information managed by the related threat information manager.

According to this aspect, the threat analysis apparatus associates threat information related to a function added by a software update of an IoT device with past threat information searched for, and outputs them. An analyst can perform analysis based on the output threat information related to the added function and the past threat information associated with the threat information. Therefore, when the function added by the software update is subjected to a cyberattack, the attack can be analyzed efficiently and the time from encountering the cyberattack to taking a countermeasure can be considerably reduced. The threat analysis apparatus can thus shorten the time from when an attack from a new threat is discovered to when the new threat is analyzed. As a result of shortening the time, the threat analysis apparatus can operate with reduced power.

For example, the IoT device may be a mobility device, and the threat analysis apparatus may further include: a threat information exchanger that exchanges the threat information.

According to this aspect, the threat analysis apparatus can shorten the time required to analyze a new threat in relation to a software update of a mobility device such as an automobile, e.g. a connected car, a construction machine, or a farm machine as the IoT device.

For example, the risk level may be defined for each function relating to mobility control.

According to this aspect, the threat analysis apparatus can define the risk level for each control of the vehicle involving running, turning, stopping, or the like, and can set the risk level according to the automatic driving level. Thus, the threat analysis apparatus can more easily shorten the time from when an attack from a new threat is discovered to when the new threat is analyzed, using the risk level defined for each control of the vehicle.

For example, the risk level may be defined based on a relationship of an electronic control unit that transmits and receives a mobility control message.

According to this aspect, the risk level can be set for each electronic control unit (ECU) in charge of control of the mobility device. For example, a higher risk level can be set for an ECU in charge of a plurality of controls. Moreover, the risk level can be set according to the level of hardware security module used by each ECU. Furthermore, the risk level can be set for each ECU supplier. Thus, the threat analysis apparatus can more easily shorten the time from when an attack from a new threat is discovered to when the new threat is analyzed, using the risk level defined for each ECU.

For example, the risk level may be defined according to a total number of authorities corresponding to an application that performs mobility control.

According to this aspect, the risk level can be set for each application in a service-oriented architecture. In particular, in in-vehicle OS applications, functions are provided as services, and which service is used by each application is defined in a manifest file. The risk level can therefore be set according to the manifest file assigned to each application. Thus, the threat analysis apparatus can more easily shorten the time from when an attack from a new threat is discovered to when the new threat is analyzed, using the risk level defined according to the number of authorities corresponding to each application.

For example, the related threat information may be managed for each vehicle type.

According to this aspect, the related threat information can be presented for each vehicle type, which contributes to efficient security analysis. Thus, the threat analysis apparatus can more easily shorten the time from when an attack from a new threat is discovered to when the new threat is analyzed, using the related threat information managed for each vehicle type.

For example, the related threat information may be managed for each vehicle.

According to this aspect, even in the case where vehicles of the same vehicle type (model) differ in update timing, the related threat information can be presented according to the update status of each individual vehicle, which contributes to more flexible and efficient security analysis. Thus, the threat analysis apparatus can more easily shorten the time from when an attack from a new threat is discovered to when the new threat is analyzed, using the related threat information managed for each vehicle.

For example, the risk level updater may update the related threat information, before completion of the function addition to the IoT device.

According to this aspect, the threat information related to the updated function can be presented immediately after the software update by the IoT device. Even when a cyberattack against the new function occurs immediately after the update, the attack can be analyzed efficiently. Thus, the threat analysis apparatus can shorten the time from when an attack from a new threat is discovered to when the new threat is analyzed, immediately after the software update by the IoT device.

For example, the risk level updater may update the related threat information, after completion of the function addition to a predetermined number of the IoT devices.

According to this aspect, the timing of presenting the threat information for the new function can be set flexibly. Specifically, the threat information for the new function can be presented after trial operation of software in a predetermined number of vehicles. Thus, the threat analysis apparatus can shorten the time from when an attack from a new threat is discovered to when the new threat is analyzed, using the flexibly set timing.

For example, the threat analysis apparatus may further include: a vehicle controller that, when the related threat information is updated by the risk level updater, transmits a control signal to a vehicle based on the related threat information updated.

According to this aspect, the vehicle can be controlled using the related threat information after the update. Thus, the threat analysis apparatus can shorten the time from when an attack from a new threat is discovered to when the new threat is analyzed and the vehicle is controlled.

A threat analysis method according to an aspect of the present disclosure include: managing update information indicating that function addition to an IoT device is performed; storing threat information of a cyberattack; managing risk level information defining a risk level of the IoT device; managing the threat information and related threat information associating the IoT device with the risk level; associating the threat information and the risk level of the IoT device with each other and updating the related threat information, based on the update information; and outputting the related threat information managed in the managing the threat information and the related threat information.

This has the same advantageous effects as the threat analysis apparatus described above.

A program according to an aspect of the present disclosure is a program for causing a computer to execute the threat analysis method described above.

This has the same advantageous effects as the threat analysis apparatus described above.

These general and specific aspects may be implemented using a system, a method, an integrated circuit, a computer program, or a computer-readable recording medium such as CD-ROM, or any combination of systems, methods, integrated circuits, computer programs, and recording media.

Embodiments will be described in detail below, with reference to the drawings.

The embodiments described below each show a general and specific example. The numerical values, shapes, materials, structural elements, the arrangement and connection of the structural elements, steps, the order of steps, etc. shown in the following embodiments are mere examples, and do not limit the scope of the present disclosure. Of the structural elements in the embodiments described below, the structural elements not recited in any one of the independent claims representing the broadest concepts are described as optional structural elements.

Embodiment 1

This embodiment will describe a threat information analysis system that shortens the time from when an attack from a new threat is discovered to when the new threat is analyzed. The threat information analysis system corresponds to a threat analysis apparatus.

This embodiment will describe an example in which, in the case where a function is added to each vehicle by a software updated function, threat information related to the added function is displayed for the vehicle based on a predetermined risk level, with reference to the drawings.

The vehicle is an example of a mobility device, and an example of an IoT device.

<Structure of Threat Information Analysis System>

FIG. 1 is a schematic diagram illustrating a structure of threat information analysis system 1 in this embodiment.

As illustrated in FIG. 1, threat information analysis system 1 includes threat information analysis server 10, threat information management server 20, update server 30, and vehicles 50a, 50b, 50c, 50d, 50e, and 50f. These devices and vehicles are connected via network 40.

Threat information management server 20 is a server that manages threat information 100.

Threat information analysis server 10 functions as a server of a security operations center that monitors the security of each of vehicles 50a to 50f. When an anomaly is detected in any of vehicles 50a to 50f, the vehicle notifies threat information analysis server 10 of the anomaly. Further, each of vehicles 50a to 50f notifies threat information analysis server 10 of the security state of the vehicle on a regular basis or on an ad hoc basis.

Threat information analysis server 10 has a security information and event management (STEM) function of analyzing a cyberattack against each of vehicles 50a to 50f using information received from the vehicle. Threat information analysis server 10 refers to threat information 100 indicating, for example, past vulnerabilities or attack procedures, in order to analyze a new cyberattack. Threat information analysis server 10 receives threat information 100 from threat information management server 20.

Update server 30 has a function of delivering vulnerability-fixed software for maintaining the security level of each of vehicles 50a to 50f after shipment, and a function of delivering software for function addition or performance improvement for each of vehicles 50a to 50f.

Network 40 is a network such as a local area network including Wi-Fi or the like, a mobile phone carrier network, or the Internet.

<Threat Information>

Figure 2:
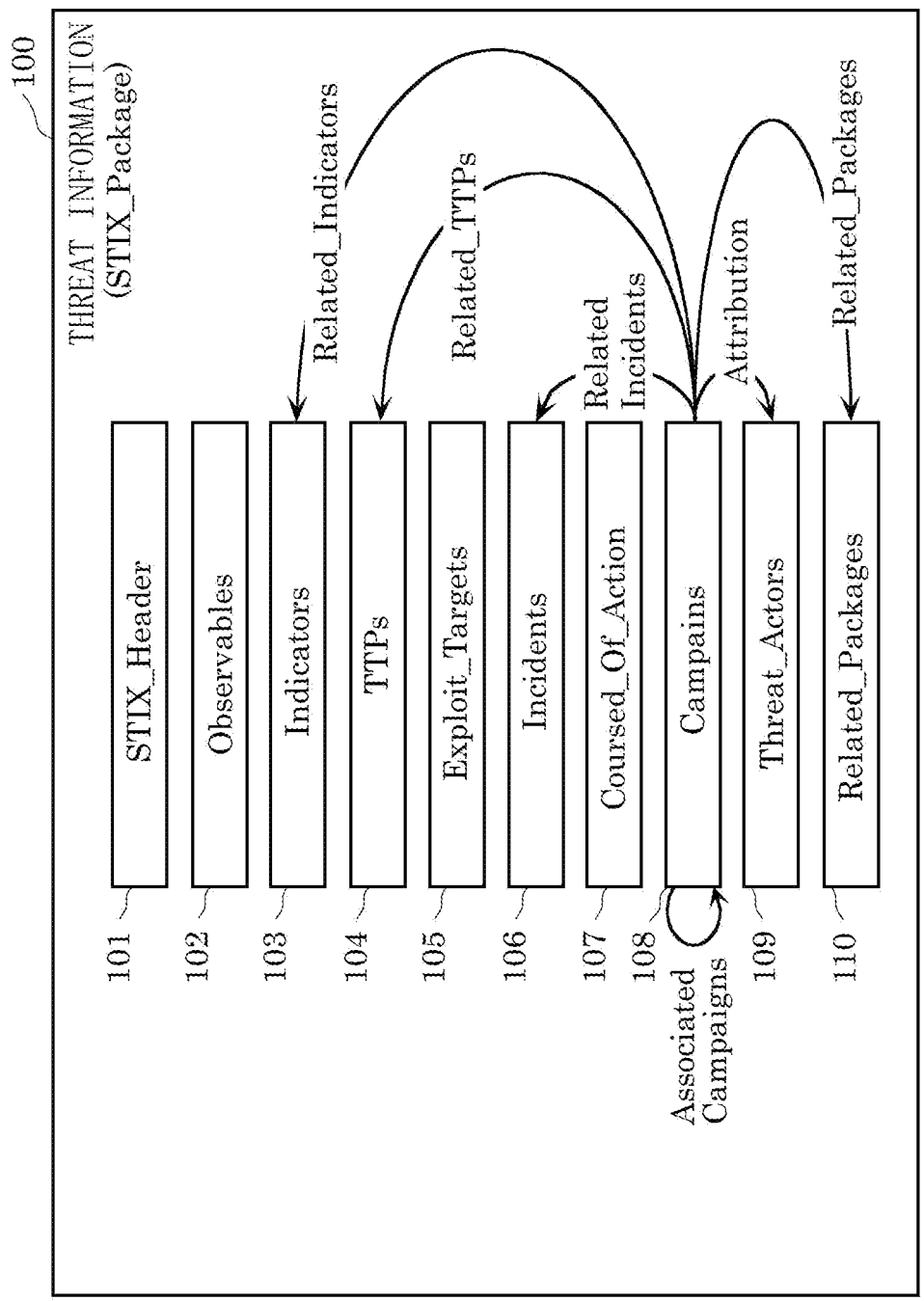
FIG. 2 is an explanatory diagram illustrating an example of threat information written in STIX in Embodiment 1.

FIG. 2 is an explanatory diagram illustrating threat information 100 which is an example of threat information written in STIX in this embodiment. Threat information 100 illustrated in FIG. 2 represents threat information managed by threat information management server 20. Threat information written in STIX is also called "STIX_Package".

To analyze a cyberattack activity, the situation needs to be summarized from the viewpoint of the attacking side, i.e. the attacker (i.e. the person or organization involved in the cyberattack), the behavior or method of the attacker, the targeted vulnerability, and the like. Moreover, to analyze the cyberattack activity, the situation needs to be summarized from the viewpoint of the protecting side, i.e. the sign for detecting the cyberattack, the problem caused by the cyberattack, the measure to be taken against the cyberattack, and the like.

Threat information 100 is written in STIX (Structured Threat Information eXpression) developed to describe such relevant information by a standardized method and to analyze threats and cyberattacks in a cyberspace, identify events that characterize cyberattacks, manage cyberattack activities, and share information about cyberattacks. FIG. 2 illustrates threat information 100 written in the format of STIX version 1.

Threat information 100 includes eight information groups: cyberattack activity (Campaigns), attacker (Threat_Actors), attack method (TTPs), detection index (Indicators), observed event (Observables), incident (Incidents), counteraction (Courses_Of_Action), and attack target (Exploit_Targets) In FIG. 2, each information field to which the cyberattack activity (Campaigns) field can be linked is indicated by an arrow.

Threat information 100 has field 101 of STIX_Header, field 110 about pertinent information of Related_Packages, and fields 102 to 109 about information of respective items relating to the cyberattack activity.

As an example, field 108 of cyberattack activity (Campaigns) is linked to the fields (103, 104, 106, 109 and 110) of respective items.

Field 108 of cyberattack activity (Campaigns) describes the intension in the cyberattack activity, the state of the attack activity, etc. Specifically, field 108 individually describes information of the intention of the cyberattack activity or the attacker (Intended_Effect). Moreover, field 108 individually describes the attack activity state (campaign:Status).

Field 109 of attacker (Threat_Actors) individually describes information about the person or organization involved in the cyberattack based on the type of the attacker of the cyberattack, the motivation of the attacker, the sophistication of the attacker, the intension of the attacker, etc. For example, field 109 describes information of the IP address, mail address, and/or social network service account of the unauthorized access source (i.e. transmitter).

Field 104 of attack method (TTPs) individually describes information about the pattern of the attack, the resources used by the attacker such as malware or tool, the attack infrastructure of the attacker, the attack target, etc. The pattern of the attack (ttp:Attack_Pattern) is written using CAPEC (Common Attack Pattern Enumeration and Classification: common attack pattern list). For example, field 104 describes information of at least one of the IP address assigned to the information processing device involved in the cyberattack and the access destination from the information processing device.

Field 103 of detection index (Indicators) individually describes information indicating the index that characterizes the cyberattack event. For example, field 103 describes the index that characterizes the cyberattack together with the type of the detection index, the observed event relating to the detection index, the attack phase, and the tool used to generate the detection index from traces and the like.

Field 102 of observed event (Observables) individually describes information indicating the event relating to the operation observed in the cyberattack event. For example, field 102 describes the filename, hash value, file size, registry value, operating service, HTTP request, and the like as events observed in the cyberattack. The description uses CybOX (Cyber Observable eXpression) which is specifications for describing observed events of cyberattacks.

Field 106 of incident (Incidents) individually describes information about the case caused by the cyberattack based on the category of the incident, the parties involved in the incident (specifically, reporter, responder, adjustor, or victim), the assets affected by the incident (specifically, owner, manager, or location), the direct or indirect effect of the incident, the incident handling status, and the like. For example, field 106 individually describes information of the owner or manager of the assets affected by the attacker of the cyberattack and/or the location of the assets.

Field 107 of counteraction (Courses_Of_Action) individually describes information indicating the counteraction against the threat by the cyberattack event based on the status of the counteraction, the type of the counteraction, and the aim, influence, cost, validity, etc. of the counteraction.

Field 105 of attack target (Exploit_Targets) individually describes information indicating the weakness of the assets targeted by the attack in the cyberattack event such as the weakness of the software or system targeted by the attack based on the vulnerability, the type of the vulnerability, the settings, the structure, and the like. For example, field 105 uses CVE (Common Vulnerability and Exposures: common vulnerability identifier) to describe the vulnerability. Field 105 uses CWE (Common Weakness Enumeration: common vulnerability type list) to describe the type of the vulnerability. Field 105 uses CCE (Common Configuration Enumeration: common security setting list) to describe the security problem in the settings.

Although threat information 100 is in the STIX format in this embodiment, the format is not limited to STIX, and other formats may be used.

<Sequence of Exchange of Threat Information 100>

Figure 3:
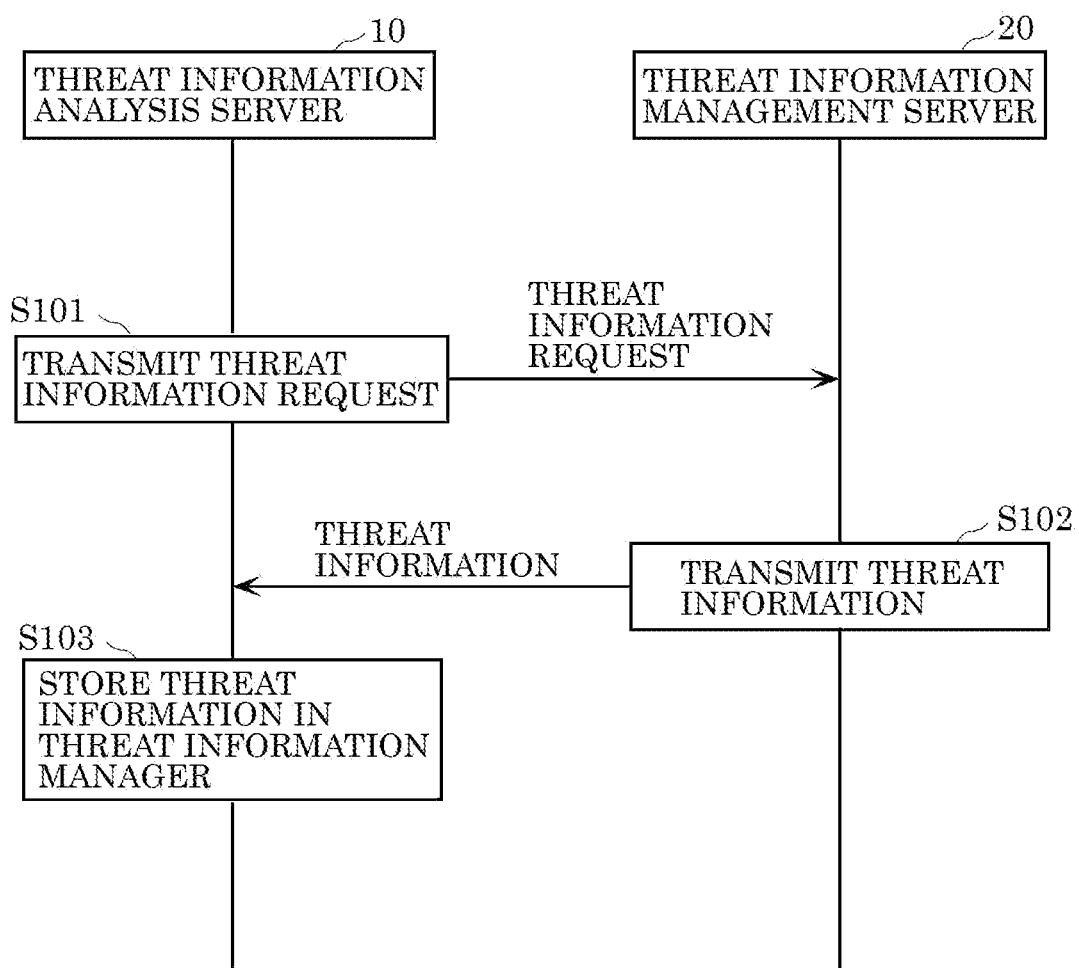
FIG. 3 is a sequence diagram illustrating a threat information exchange procedure in Embodiment 1.

FIG. 3 is a sequence diagram illustrating a threat information exchange procedure in this embodiment. FIG. 3 illustrates a procedure when threat information analysis server 10 collects threat information 100 from threat information management server 20.

In Step S101, threat information analysis server 10 accesses threat information management server 20. Specifically, threat information analysis server 10 transmits a threat information request to threat information management server 20. Threat information management server 20 receives the transmitted threat information request.

In Step S102, threat information management server 20 transmits threat information 100 to threat information analysis server 10, in response to receiving the threat information request in Step S101. Threat information analysis server 10 receives transmitted threat information 100.

In Step S103, threat information analysis server 10 stores threat information 100 received in Step S102, in threat information manager 400.

In Steps S101 and S102, for example, the exchange of the threat information is performed according to a TAXII (Trusted Automated eXchange of Indicator Information) protocol defined as a threat information exchange procedure. This exchange sequence may be performed on a regular basis, or performed when threat information is newly registered. Although TAXII is used for the threat information exchange procedure in this embodiment, the threat information exchange procedure is not limited to the TAXII protocol, and other communication protocols may be used.

<Threat Information Analysis Server 10>

Figure 4:
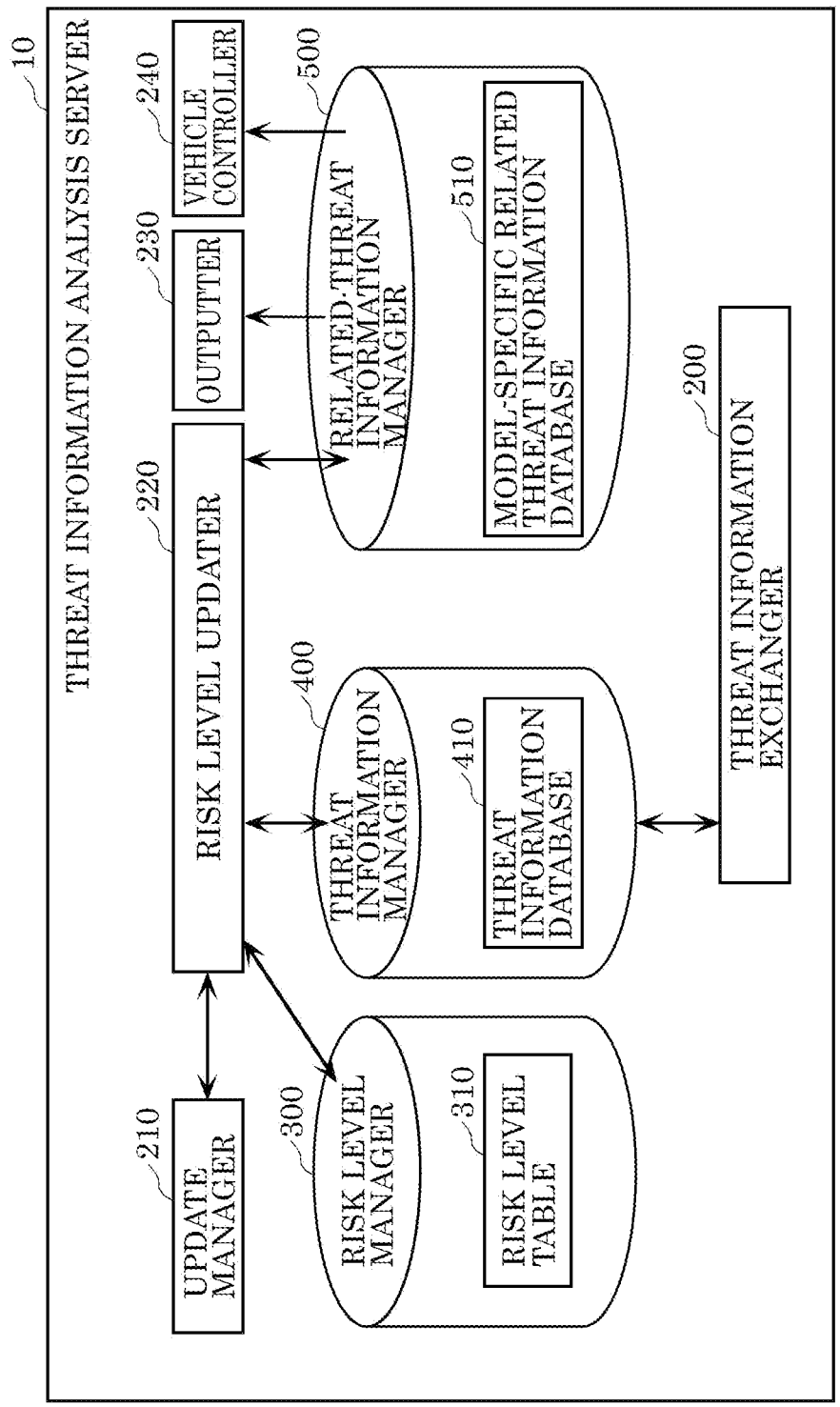
FIG. 4 is an explanatory diagram illustrating a structure of a threat information analysis server in Embodiment 1.

FIG. 4 is an explanatory diagram illustrating a structure of threat information analysis server 10.

As illustrated in FIG. 4, threat information analysis server 10 includes threat information exchanger 200, update manager 210, risk level updater 220, outputter 230, vehicle controller 240, risk level manager 300, threat information manager 400, and related threat information manager 500.

Threat information exchanger 200 is a processing unit that exchanges threat information. Specifically, threat information exchanger 200 obtains threat information 100 from threat information management server 20 according to the TAXII protocol illustrated in FIG. 3.

Update manager 210 receives vulnerability-fixed software for maintaining the security level of each of vehicles 50a to 50f after shipment, from update server 30. Update manager 210 also receives information of the delivery status of software for function addition or performance improvement of each of vehicles 50a to 50f, updated software, and a vehicle function. Update manager 210 provides the information received from update server 30, to risk level manager 300.

Risk level updater 220 is a processing unit that associates threat information and a risk level of a vehicle with each other and updates related threat information based on update information. Specifically, risk level updater 220 updates risk level table 310 stored in risk level manager 300 based on the information received from update manager 210. Risk level updater 220 also determines whether threat information 100 related to the update contents received from update manager 210 is included in threat information database 410 managed in threat information manager 400. In the case where risk level updater 220 determines that threat information 100 related to the update contents is included in threat information database 410, risk level updater 220 updates model-specific related threat information database 510 held in related threat information manager 500 based on risk level table 310. The sequence will be described in detail later.

Risk level manager 300 manages the risk level table in which risk levels of vehicles are defined. The risk level table may be defined for each function relating to mobility control of vehicles, defined for each electronic control unit (ECU) that transmits and receives mobility control messages, or defined according to the number of authorities corresponding to each application that performs mobility control. The risk level table thus defined will be described in detail later. The risk level table is an example of risk level information defining a risk level of an IoT device.

Threat information manager 400 holds threat information database 410. Threat information database 410 corresponds to cyberattack threat information.

Related threat information manager 500 manages threat information and related threat information associating a vehicle with a risk level. Specifically, related threat information manager 500 holds and manages model-specific related threat information database 510.

Outputter 230 outputs the contents of model-specific related threat information database 510, thus presenting the contents to a security analyst who analyzes cyberattacks using threat information analysis server 10. For example, outputter 230 includes a display screen, and displays related threat information for each vehicle type model in an easily understandable manner, to present the contents of model-specific related threat information database 510 to the security analyst.

Vehicle controller 240 is a processing unit that transmits a control signal to each vehicle based on related threat information. More specifically, in the case where risk level updater 220 updates the related threat information, vehicle controller 240 transmits the control signal to the vehicle based on the related threat information after the update. For example, the control signal relates to control of preventing software that can be attacked by a threat from running in the vehicle, or control of presenting a message indicating that the software can be attacked by a threat to the driver of the vehicle.

<Function-Specific Risk Level Table>

FIG. 5 is an explanatory diagram illustrating an example of a function-specific risk level table held in risk level manager 300 in this embodiment.

FIG. 5 illustrates function-specific risk level table 311 which is an example of risk level table 310 and in which a risk level is defined for each function of a vehicle.

Function-specific risk level table 311 includes automatic driving level, function of the vehicle, and risk level corresponding to the function. Herein, "automatic driving level" is a typical index indicating the level of vehicle automation.

In FIG. 5, a risk level is defined for each of the functions of a vehicle set corresponding to automatic driving levels.

Functions corresponding to automatic driving level 0 include, for example, blind spot detection function. In the case where the automatic driving level of the vehicle is 0, the driver performs all driving operations at all times, without any intervention of the automatic driving system in vehicle control.

Functions corresponding to automatic driving level 1 include, for example, adaptive cruise control (ACC), lane departure prevention, and automatic braking. Automatic driving level 1 is an automatic driving level at which the automatic driving system supports any of steering operation and acceleration/deceleration.

Functions corresponding to automatic driving level 2 include, for example, congestion following, parking assistance, automatic lane change, cut-in deceleration, and lane centering. Automatic driving level 2 is an automatic driving level at which the automatic driving system supports both steering operation and acceleration/deceleration.

Functions corresponding to automatic driving level 3 include, for example, high-speed following, overtaking, merging/branching, sharp-curve automatic traveling, main lane departure, emergency pullover, and automatic parking. Automatic driving level 3 is an automatic driving level at which the automatic driving system automates all operations in specific locations. In the event of an emergency, however, the operation by the driver is required.

Functions corresponding to automatic driving level 4 include, for example, stop/start at traffic light, pedestrian/bicycle avoidance, obstacle avoidance, slowdown as needed, right or left turn/stop/entry at intersection, traveling according to traffic signs, oncoming vehicle avoidance, large vehicle identification, and narrow road traveling. Automatic driving level 4 is an automatic driving level at which the automatic driving system automates all operations in specific locations. Response in the event of an emergency is also automated.

Functions corresponding to automatic driving level 5 include, for example, stop/start at traffic light, pedestrian/bicycle avoidance, obstacle avoidance, slowdown as needed, right or left turn/stop/entry at intersection, traveling according to traffic signs, oncoming vehicle avoidance, large vehicle identification, and narrow road traveling. Automatic driving level 5 is an automatic driving level at which the automatic driving system automates all operations in all situations.

The vehicle also has the functions corresponding to the automatic driving levels below the automatic driving level of the vehicle. In other words, a vehicle whose automatic driving level is N (where N=0 to 5) has the functions corresponding to the automatic driving levels lower than or equal to automatic driving level N.

Thus, when the automatic driving level is higher, the range of control by the automatic driving system is wider, that is, the vehicle has more functions. Accordingly, a higher risk level is set when the automatic driving level is higher.

In FIG. 5, the functions corresponding to automatic driving level 0 are set to have risk level 1, the functions corresponding to automatic driving level 1 are set to have risk level 2, the functions corresponding to automatic driving level 2 are set to have risk level 3, the functions corresponding to automatic driving level 3 are set to have risk level 4, the functions corresponding to automatic driving level 4 are set to have risk level 5, and the functions corresponding to automatic driving level 5 are set to have risk level 6.

Although the functions of the same automatic driving level are set to have the same risk level in this example, the functions of the same automatic driving level may have different risk levels.

<Related ECU-Specific Risk Level Table>

FIG. 6 is an explanatory diagram illustrating an example of a related ECU-specific risk level table held in risk level manager 300 in this embodiment.

FIG. 6 illustrates related ECU-specific risk level table 312 which is an example of risk level table 310 and in which a risk level is defined for each ECU installed in an in-vehicle network system.

Related ECU-specific risk level table 312 defines ECU manufacturer, ECU identification information, ECU software version, information of an ECU in message transmission and reception relationship, camera/sensor usability status, and ECU-specific risk level. An ECU in message transmission and reception relationship is also referred to as "related ECU".

In FIG. 6, for example, ECU_A1 of ECU manufacturer A has ACC software version 1.0, is in message transmission and reception relationship with ECU_B2, and uses information of a camera and radar for function implementation.

For ECU_A3, a risk level is defined for each of its two versions. Specifically, in software version 1.0 of ECU_A3, the ECU is in message transmission and reception relationship with ECU_A2, and the vehicle has parking assistance function. In software version 2.0 of ECU_A3, the ECU is in message transmission and reception relationship with ECU_A1 as well as ECU_A2, and the vehicle has automatic parking function in addition to parking assistance function.

When a function is added, the number of ECUs performing message transmission and reception with the ECU, i.e. the number of related ECUs, increases. The increase of the number of ECUs performing message transmission and reception poses the possibility that a vulnerability of one ECU risks the ECUs performing transmission and reception. Accordingly, a higher risk level is set when the number of related ECUs is greater.

<Application Authority-Specific Risk Level Table>

FIG. 7 is an explanatory diagram illustrating an example of an application authority-specific risk level table held in risk level manager 300 in this embodiment.

FIG. 7 illustrates application authority-specific risk level table 313 in which a risk level is defined for each authority of an application implemented in a vehicle, as risk level table 310. Application authority-specific risk level table 313 includes application supplier name, application ID, software version, function of the application, access authority information to a function or device held by the application, and risk level.

In FIG. 7, for example, software version 1.0 of application A3 of supplier A holds access authority information to steering operation, accelerator operation, camera, and radar, and supports parking assistance function.

Software version 2.0 of application A3 holds authority information to not only parking assistance function but also brake operation, and has automatic parking function in addition.

When an access authority of the application to a function or device is added, the range of control on the vehicle is wider. The increase of the number of access authorities of the application raises the risk to vehicle control caused by a vulnerability of one application. Accordingly, a higher risk level is set when the number of access authorities is greater.

<Threat Information Database 410>

FIG. 8 is an explanatory diagram illustrating threat information database 410 as an example of a threat information database held in threat information manager 400 in this embodiment.

Threat information manager 400 stores threat information 100 obtained by threat information exchanger 200.

Threat information database 410 is a table indicating, for each item of threat information included in threat information 100, whether the threat information is a threat related to a function, ECU, or application included in a vehicle. For example, ECU_A3 and application A3 relate to threat information IDs 003, 010, and 020. This is because ECU_A3 and application A3 have parking assistance and automatic parking assistance function.

<Model-Specific Related Threat Information Database (Before Update)>

FIG. 9 is an explanatory diagram illustrating model-specific related threat information database 510 as an example of a model-specific related threat information database held in related threat information manager 500.

Model-specific related threat information database 510 is a table in which threat information and its risk level are managed for each vehicle type model.

Specifically, model-specific related threat information database 510 includes automobile manufacturer, vehicle type information, function information, ECU ID of an ECU controlling the function, risk level, and ID of threat information related to the ECU.

FIG. 9 illustrates an example in which a risk level is set for each vehicle based on related ECU-specific risk level table 312 in FIG. 6. For example, ECU_A1 of vehicle type model A1 of automobile manufacturer OEM_A has ACC function, the risk level of ACC function is 2, and threat information related to ACC or ECU_A1 is threat information 001.

ECU_A3 of vehicle type model A1 of automobile manufacturer OEM_A has parking assistance function, the risk level of parking assistance function is 3, and threat information related to parking assistance function or ECU_A3 is threat information 003.

<Model-Specific Related Threat Information Database (After Update)>

FIG. 10 is an explanatory diagram illustrating model-specific related threat information database 510A as an example of the model-specific related threat information database after addition of a function by an update in this embodiment.

In the case where a function of a vehicle is added and there is a function relating to the added function, threat information related to the added function is added to model-specific related threat information database 510, yielding model-specific related threat information database 510A.

FIG. 10 illustrates model-specific related threat information database 510A in the case where automatic parking function is newly added, by a software update, to ECU_A3 of vehicle type model A1 of automobile manufacturer OEM_A having parking assistance function. The risk level of automatic parking function of ECU_A3 is 4, and threat information 010 and threat information 020 are newly added as threat information related to ECU_A3 or automatic parking function.

<Update Sequence>

Figure 11:
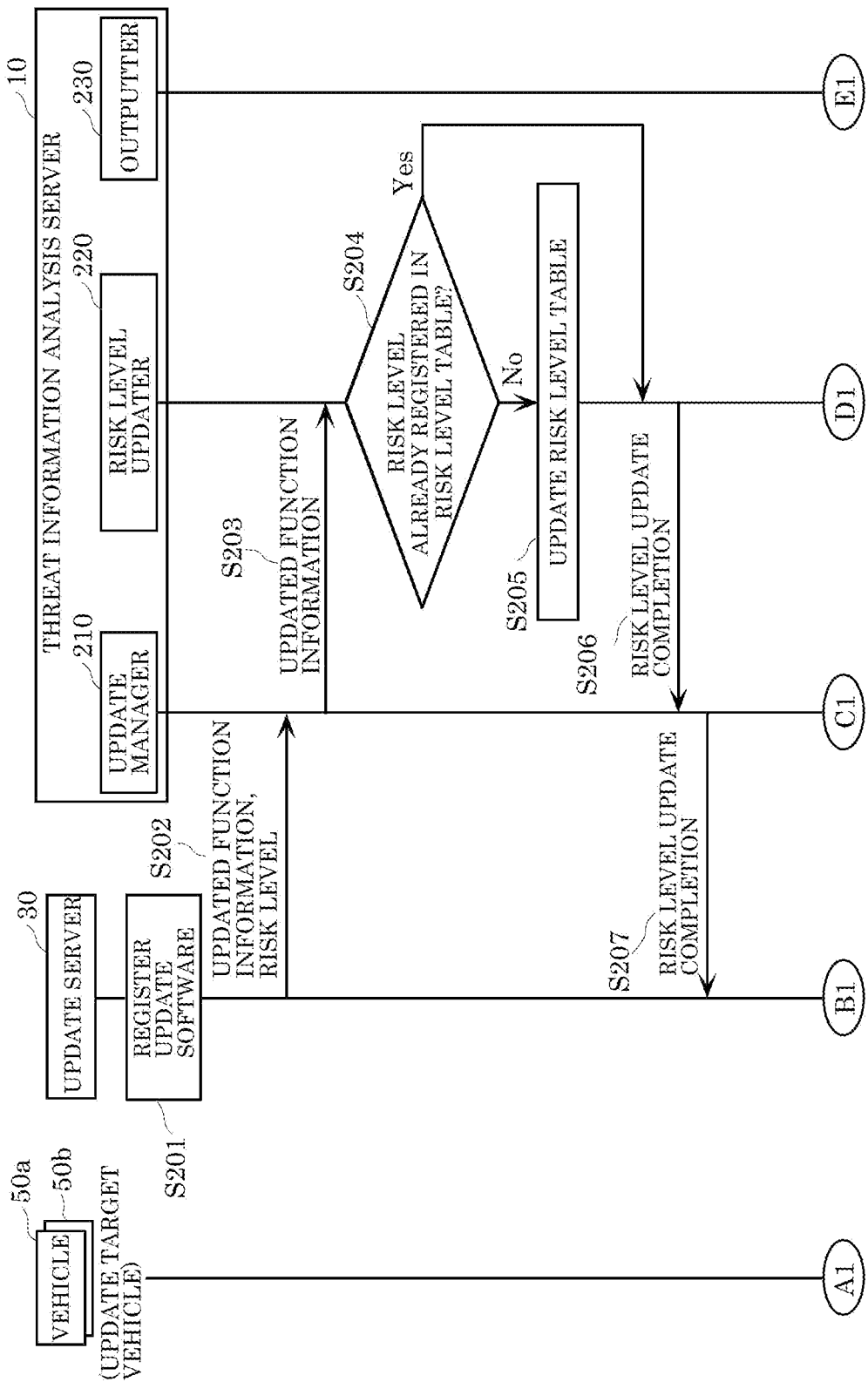
FIG. 11 is a sequence diagram illustrating a process of updating vehicle type-specific related threat information at function addition in Embodiment 1.
Figure 12:
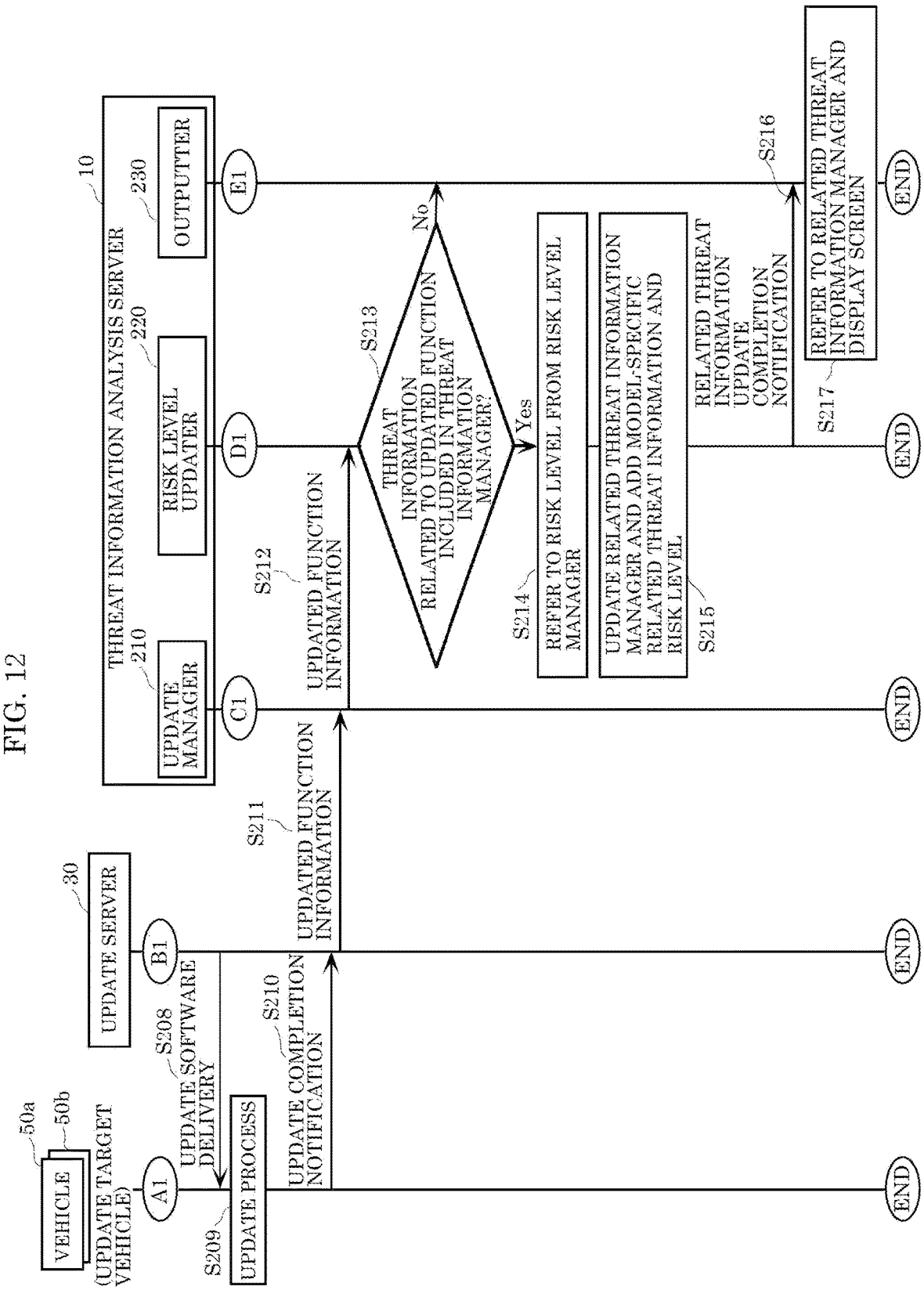
FIG. 12 is a sequence diagram illustrating a process of updating related threat information at function addition in Embodiment 1.

FIGS. 11 and 12 are an explanatory diagram illustrating a sequence when software installed in vehicles 50a to 50f is updated by OTA and a function is added. An example in which software of parking assistance function (risk level 3) of ECU_A3 of vehicle type model A1 of automobile manufacturer OEM_A is updated to software supporting automatic parking function (risk level 4) and the function is added will be described here.

More specifically, FIG. 11 is a sequence diagram illustrating a process of updating vehicle type-specific related threat information at function addition in this embodiment. FIG. 12 is a sequence diagram illustrating a process of updating related threat information at function addition in this embodiment.

As illustrated in FIG. 11, in Step S201, target software a to be updated and information about an updated function are registered in update server 30. For example, new software of ECU_A3 is registered. As updated function information, information of an automobile manufacturer as the delivery destination, vehicle type information, added function information, update target ECU information (ID of ECU, hardware version information of ECU, or software version information of ECU), and risk level are registered.

In Step S202, update server 30 transmits the updated function information registered in Step S201, to update manager 210 in threat information analysis server 10.

In Step S203, update manager 210 transmits the updated function information to risk level updater 220.

In Step S204, risk level updater 220 determines whether the updated function information received in Step S203 is registered in risk level table 310. In the case where risk level updater 220 determines that the updated function information is registered in risk level table 310 (Step S204: Yes), the process advances to Step S206. Otherwise (Step S204: No), the process advances to Step S205.

In Step S205, risk level updater 220 updates risk level table 310. Specifically, in the case where function-specific risk levels are defined, function-specific risk level table 311 illustrated in FIG. 5 is updated. In the case where ECU-specific risk levels are defined, related ECU-specific risk level table 312 illustrated in FIG. 6 is updated. In the case where application-specific risk levels are defined, application authority-specific risk level table 313 illustrated in FIG. 7 is updated. Function-specific risk level table 311, related ECU-specific risk level table 312, and application authority-specific risk level table 313 may be combined to determine risk levels.

In Step S206, risk level updater 220 notifies update manager 210 of the completion of the update of the risk level table.

In Step S207, update manager 210 notifies update server 30 of the completion of the update of the risk level table.

Referring now to FIG. 12, in Step S208, update server 30 delivers new software to vehicles 50a to 50f. For example, in the case of updating the software of parking assistance function (risk level 3) of ECU_A3 of vehicle type model A1 of automobile manufacturer OEM_A to the software supporting automatic parking function (risk level 4), update server 30 delivers the update software to vehicles 50a and 50b which are each an update target vehicle.

In Step S209, each update target vehicle performs an update to the software received in Step S208. In the update process, it is desirable that the software is distributed with a digital signature and the signature of the software is verified in vehicle, although its detailed description is omitted here.

In Step S210, after the update process ends, the update target vehicle transmits an update completion notification notifying the completion of the update of the software, to update server 30.

In Step S211, update server 30 transmits updated function information which is information about the updated function, to threat information analysis server 10.

In Step S212, update manager 210 in threat information analysis server 10 transmits the updated function information to risk level updater 220.

In Step S213, risk level updater 220 determines whether threat information related to the updated function is included in threat information database 410 in threat information manager 400. In the case where risk level updater 220 determines that threat information related to the updated function is not included (Step S213: No), the process advances to Step S217. In the case where risk level updater 220 determines that threat information related to the updated function is included (Step S213: Yes), the process advances to Step S214.

In Step S214, risk level updater 220 refers to the risk level of the updated function in function-specific risk level table 311 in risk level manager 300.

In Step S215, risk level updater 220 adds the updated function information and the threat information and the risk level related to the updated function to model-specific related threat information database 510 in related threat information manager 500, thus updating model-specific related threat information database 510.

For example, in the case of updating the software of parking assistance function (risk level 3) of ECU_A3 of vehicle type model A1 of automobile manufacturer OEM_A to the software supporting automatic parking function (risk level 4), model-specific related threat information database 510 before the update in Step S215 has the functions, threat information, and risk levels registered as illustrated in FIG. 9, whereas, after the process in Step S215, the threat information and the risk level related to automatic parking function are added as illustrated in FIG. 10.

In Step S216, risk level updater 220 transmits a related threat information update completion notification notifying the completion of the update of the model-specific related threat information database, to outputter 230.

In Step S217, outputter 230 displays the information registered in the model-specific related threat information database, on a display screen using a user interface easily interpreted by the security analyst.

As described above, risk level updater 220 updates the related threat information before the completion of the function addition in the vehicle. This enables threat information analysis server 10 to present the threat information related to the updated function immediately after the software update. Hence, even when a cyberattack against the new function occurs immediately after the update, the attack can be analyzed efficiently.

Risk level updater 220 may update the related threat information after the completion of the function addition in a predetermined number of vehicles. This enables threat information analysis server 10 to flexibly set the timing of presenting the threat information related to the new function. Specifically, the threat information related to the new function can be presented after trial operation of the software in the predetermined number of vehicles.

<Output Screen Image Before Function Addition>

Figure 13:
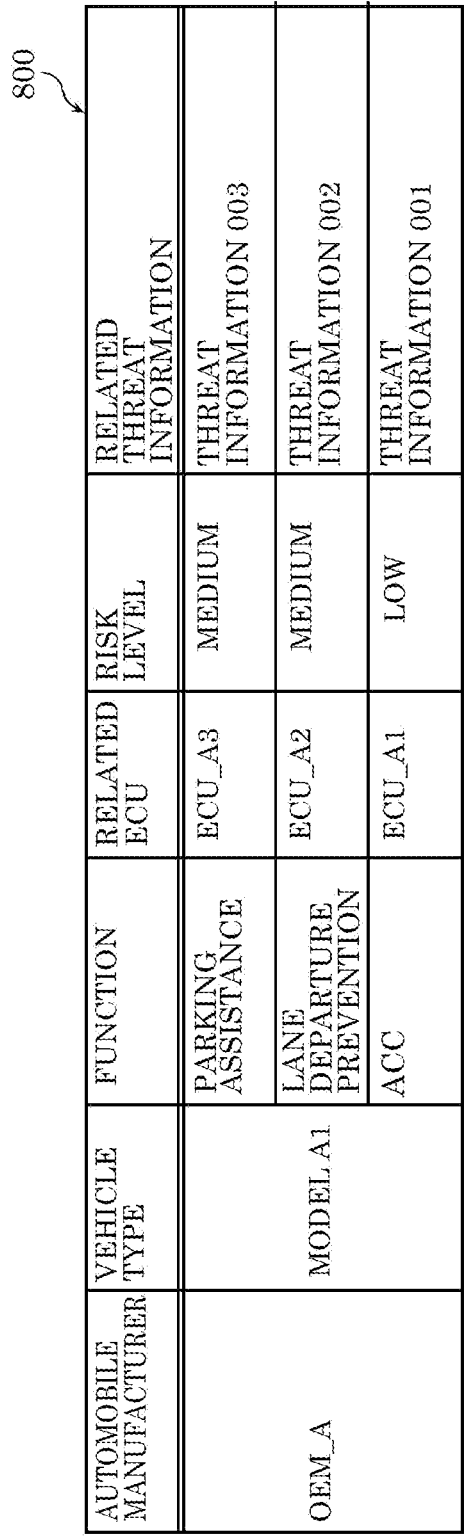
FIG. 13 is an explanatory diagram illustrating an example of a related threat information output screen before an update for function addition in Embodiment 1.

FIG. 13 is an explanatory diagram illustrating an example of a related threat information output screen before an update for function addition in this embodiment. FIG. 13 illustrates an example of display of the model-specific related threat information database in FIG. 9.

In FIG. 13, related threat information output screen 800 is a display example before the software of parking assistance function (risk level 3) of ECU_A3 of vehicle type model A1 of automobile manufacturer OEM_A is updated to the software supporting automatic parking function (risk level 4) and the function is added.

In related threat information output screen 800 illustrated in FIG. 13, for each function of vehicle type model A1 of automobile manufacturer OEM_A, the ECU related to the function, the risk level of the function, and the threat information related to the function are indicated.

The analyst is expected to recognize the risk level of each function from the output screen illustrated in FIG. 13 and use the information in log analysis. The analyst analyzes the logs uploaded from vehicle 50a or the like to threat information analysis server 10, to monitor if vehicle 50a is attacked by a new threat or a known threat. Here, the analyst analyzes the logs uploaded from vehicle 50a or the like, while preferentially paying attention to threats of higher risk levels on the output screen illustrated in FIG. 13. This has the effect of shortening the time from when a threat of a high risk level is discovered to when the threat is analyzed.

Although the risk levels are rounded to three levels of high, medium, and low in the display in FIG. 13, the risk levels may be displayed based on the risk level table held in risk level manager 300.

<Output Screen Image After Function Addition>

FIG. 14 is an explanatory diagram illustrating an example of a related threat information output screen after the update for function addition in this embodiment. FIG. 14 illustrates an example of display of the model-specific related threat information database in FIG. 10.

Related threat information output screen 810 is a display example after the software of parking assistance function (risk level 3) of ECU_A3 of vehicle type model A1 of automobile manufacturer OEM_A is updated to the software supporting automatic parking function (risk level 4) and the function is added.

In related threat information output screen 810 illustrated in FIG. 14, in addition to related threat information output screen 800 (see FIG. 13), mark 811 indicating that the added automatic parking function is a new function is displayed. Moreover, mark 812 indicating warning on the ground that the risk level of the automatic parking function as the new function is "high" is displayed.

<Effects in Embodiment 1>

According to Embodiment 1, for example, in the case of updating the software of parking assistance function (risk level 3) of ECU_A3 of vehicle type model A1 of automobile manufacturer OEM_A to the software supporting automatic parking function (risk level 4) and adding the function, related threat information output screen 810 can be displayed in such a manner that the threat information related to the automatic driving function as the new function is preferentially displayed with its high risk level being recognizable. The analyst viewing related threat information output screen 810 can perform analysis while intuitively paying attention to the automatic parking function based on marks 811 and 812.

In the case where the automatic parking function of high risk level is cyberattacked, the security analyst can efficiently analyze the attack, and the time to the delivery of software with which the vulnerability of the software of the automatic parking function is fixed can be shortened considerably. As a result of the time from the occurrence of the attack to the delivery of the pertinent software being shortened, the spread of damage can be prevented. This provides very high security effects.

Embodiment 2

In Embodiment 1, model-specific related threat information is displayed based on the contents of update by OTA. However, the update timing is different between individual vehicles even in the case where the vehicles are of the same model. In Embodiment 2, threat information is presented not according to the model but according to the update status of each individual vehicle. The structure in Embodiment 2 is similar to that in Embodiment 1, and only the differences from Embodiment 1 will be described below.

Related threat information manager 500 holds vehicle-specific related threat information database 520, instead of model-specific related threat information database 510 in Embodiment 1.

<Update Sequence>

FIG. 15 is a sequence diagram illustrating a process of updating vehicle-specific related threat information in the case where a function is added by an update in this embodiment. The process in Embodiment 2 is the same as that in Embodiment 1 in Steps S201 to S207 illustrated in FIG. 11, and accordingly the description of these steps is omitted. Steps S308 to S317 illustrated in FIG. 15 correspond to Steps S208 to S217 illustrated in FIG. 12 in Embodiment 1. The differences from Embodiment 1 will be described below.

An example in which software of parking assistance function (risk level 3) of each of the vehicles with respective vehicle IDs "VID_A1" and "VID_A2" of vehicle type model A1 of automobile manufacturer OEM_A is updated to software supporting automatic parking function (risk level 4) and the function is added will be described here.

In Step S308, update server 30 delivers new software to vehicles 50a to 50f. For example, in the case of updating the software of parking assistance function (risk level 3) of ECU_A3 of vehicle type model A1 of automobile manufacturer OEM_A to the software supporting automatic parking function (risk level 4), update server 30 delivers the update software to the vehicles with respective vehicle IDs "VID_A1" and "VID_A2".

In Step S309, each update target vehicle (VID_A1 and VID_A2) performs an update to the software received in Step S308. In the update process, it is desirable that the software is distributed with a digital signature and the signature of the software is verified in vehicle, although its detailed description is omitted here.

In Step S310, after the update process ends, each update target vehicle (VID_A1 and VID_A2) transmits an update completion notification notifying the completion of the update of the software to update server 30, together with the vehicle ID.

In Step S311, update server 30 transmits updated function information which is information about the updated function, to threat information analysis server 10.

In Step S312, update manager 210 in threat information analysis server 10 transmits the updated function information to risk level updater 220.

In Step S313, risk level updater 220 determines whether threat information related to the updated function is included in threat information database 410 in threat information manager 400. In the case where risk level updater 220 determines that threat information related to the updated function is not included (Step S313: No), the process advances to Step S317. In the case where risk level updater 220 determines that threat information related to the updated function is included (Step S313: Yes), the process advances to Step S314.

In Step S314, risk level updater 220 refers to the risk level of the updated function in function-specific risk level table 311 in risk level manager 300.

In Step S315, risk level updater 220 adds the updated function information and the threat information and the risk level related to the updated function to the vehicle-specific related threat information database in related threat information manager 500 and also records the vehicle-specific update status, thus updating the vehicle-specific related threat information database.

For example, in the case of updating the software of parking assistance function (risk level 3) of ECU_A3 of each of vehicles VID_A1 and VID_A2 of vehicle type model A1 of automobile manufacturer OEM_A to the software supporting automatic parking function (risk level 4), the update status of each vehicle is recorded. The vehicle-specific related threat information database will be described later, with reference to FIG. 16.

In Step S316, risk level updater 220 transmits a related threat information update completion notification notifying the completion of the update of the vehicle-specific related threat information database, to outputter 230.

In Step S317, outputter 230 displays the information registered in the vehicle-specific related threat information database, on a display screen using a user interface easily interpreted by the security analyst.

<Vehicle-Specific Related Threat Information Database>

FIG. 16 is an explanatory diagram illustrating vehicle-specific related threat information database 520 as an example of the vehicle-specific related threat information database in this embodiment.

Vehicle-specific related threat information database 520 includes automobile manufacturer, vehicle type information, vehicle ID, function information, ECU ID of an ECU controlling the function, ECU software version, ECU software update status, risk level, and ID of threat information related to the ECU.

In the example of updating the software (Version 1.0) of parking assistance function (risk level 3) of ECU_A3 of each of vehicles VID_A1 and vehicle VID_A2 of vehicle type model A1 of automobile manufacturer OEM_A to the software (Version 2.0) supporting automatic parking function (risk level 4), vehicle VID_A1 is not updated and vehicle VID_A2 is updated in FIG. 16.

<Display of Vehicle-Specific Related Threat Information>

FIG. 17 illustrates an example of displaying the vehicle-specific related threat information database in FIG. 16.

Related threat information output screen 900 is a display example after the software of parking assistance function of ECU_A3 of vehicle type model A1 of automobile manufacturer OEM_A is updated to the software supporting automatic parking function (risk level 4) and the function is added. Related threat information output screen 900 indicates that the software of parking assistance function of ECU_A3 is not updated in vehicle VID_A1 and the software is updated in vehicle VID_A2.

In related threat information output screen 900 illustrated in FIG. 17, mark 811 indicating that the added automatic parking function and parking assistance function are each a new function is displayed, as in FIG. 14. Moreover, for vehicle VID_A1, mark 812 indicating warning is displayed on the ground that the software is not updated. Mark 812 in this case can be regarded as a mark informing the analyst that the software is not updated, or a mark informing the analyst that the software needs to be updated. For vehicle VID_A2, mark 812 indicating warning to the analyst is displayed on the ground that the risk level of the automatic parking function as the new function is high.

<Effects in Embodiment 2>

The update timing is different between individual vehicles even in the case where the vehicles are of the same model. According to Embodiment 2, threat information can be presented not according to the model but according to the update status of each individual vehicle, so that security analysis according to the update status can be realized.

<Other Variations>

While the present disclosure has been described by way of the foregoing embodiments, the present disclosure is not limited to the foregoing embodiments. The following variations are also included in the scope of the present disclosure.

(1) Although the foregoing embodiments describe analysis of cyberattacks against automobiles using threat information, the range of applications is not limited to such. The present disclosure may be applied to mobilities that include not only automobiles but also construction machines, farm machines, ships, trains, aircraft, etc. The present disclosure may be applied to communication networks used in industrial control systems of factories, buildings, and the like, or communication networks for controlling embedded devices. The present disclosure may be more broadly applied to IoT devices. IoT devices are a concept including the foregoing mobilities and home appliances, and are a concept indicating devices that have communication interfaces but have relatively small resources used in computation and the like. The concept of IoT devices does not include information processing devices such as personal computers and smartphones.

(2) Although the foregoing embodiments describe the case where risk level manager 300 defines the risk level for each function, for each application authority, or for each ECU, the present disclosure is not limited to such. For example, the risk levels may be defined for each OS used, for each communication protocol (e.g. CAN (Controller Area Network), CAN-FD (Controller Area Network with Flexible Data Rate), Ethernet, LIN (Local Interconnect Network), Flexray) supported by the ECU, or for each combination thereof.

(3) Although the foregoing embodiments describe the case where only one item of threat information is associated with each function, a plurality of items of related threat information may be associated with the function. This enables analysis of even a sophisticated attack combining a plurality of attack techniques. In the case where a plurality of items of threat information are associated with the function, outputter 230 may output these items of related threat information rearranged according to the attack procedure. This enables analysis while following the attack procedure, so that the time to take a countermeasure can be shortened.

(4) Although the foregoing embodiments describe the case where the related threat information is displayed in table form, the related functions and threat information may be displayed in tree form. Since branches from functions or ECUs with many items of related threat information appear dense, points susceptible to attacks can be clearly presented.

(5) Although the foregoing embodiments describe the case where the past threat information is searched for the threat information related to the function added by the software update and the threat information is associated with the function, if no such threat information is included in the past threat information, related threat information may be registered in such a form that indicates there is no threat information at the time. While there is no related past threat information, new threat information may be associated and registered as related threat information.

(6) Although the foregoing embodiments describe the case where the search for the threat information related to the updated function is performed at the time of software update, this search process may be performed on a regular basis. This makes it possible to always associate latest threat information with the function.

(7) Part or all of the structural elements constituting each device in the foregoing embodiments may be configured as a single system large scale integration (LSI). A system LSI is a super-multifunctional LSI manufactured integrating multiple components on a single chip, and specifically is a computer system including a microprocessor, ROM, RAM, and so forth. A computer program is recorded in the RAM. The system LSI achieves its functions by the microprocessor operating according to the computer program.

The parts of the structural elements constituting each device may be individually formed into one chip, or part or all thereof may be included in one chip.

While description has been made regarding a system LSI, there are different names such as IC, LSI, super LSI, and ultra LSI, depending on the degree of integration. The circuit integration technique is not limited to LSIs, and dedicated circuits or general-purpose processors may be used to achieve the same. A field programmable gate array (FPGA) which can be programmed after manufacturing the LSI, or a reconfigurable processor where circuit cell connections and settings within the LSI can be reconfigured, may be used.

Further, in the event of the advent of an integrated circuit technology which would replace LSIs by advance of semiconductor technology or a separate technology derived therefrom, such a technology may be used for integration of the functional blocks, as a matter of course. Application of biotechnology is a possibility.

(8) Part or all of the structural elements constituting each device may be configured as an IC card detachably mountable to the device or a standalone module. The IC card or module is a computer system including a microprocessor, ROM, RAM, and so forth. The IC card or module may include the above-described super-multifunctional LSI. The IC card or module achieves its functions by the microprocessor operating according to the computer program. The IC card or module may be tamper-resistant.

(9) The present disclosure may be the above-described methods, or may be a computer program which realizes these methods by a computer, or may be digital signals made up of the computer program.

The present disclosure may be the computer program or the digital signals recorded in a computer-readable recording medium, such as flexible disk, hard disk, CD-ROM, MO, DVD, DVD-ROM, DVD-RAM, Blu-ray® disc (BD), or semiconductor memory. The present disclosure may also be the digital signals recorded in these recording mediums.

The present disclosure may be an arrangement where the computer program or the digital signals are transmitted over an electric communication line, a wireless or wired communication line, a network such as the Internet, data broadcasting, or the like.

The present disclosure may be a computer system having a microprocessor and memory, where the memory records the computer program, and the microprocessor operates according to the computer program.

The present disclosure may also be carried out by another independent computer system, by the program or digital signals being recorded in the recording medium and being transported, or by the program or digital signals being transferred over the network or the like.

(10) The foregoing embodiments and variations may be combined in any way.

Each of the structural elements in each of the foregoing embodiments may be configured in the form of an exclusive hardware product, or may be realized by executing a software program suitable for the structural element. Each of the structural elements may be realized by means of a program executing unit, such as a CPU and a processor, reading and executing the software program recorded on a recording medium such as a hard disk or semiconductor memory. For example, software for realizing the threat analysis apparatus, etc. according to each of the foregoing embodiments is the following program.

The program causes a computer to execute a threat analysis method that includes: managing update information indicating that function addition to an IoT device is performed; storing threat information of a cyberattack; managing risk level information defining a risk level of the IoT device; managing the threat information and related threat information associating the IoT device with the risk level; associating the threat information and the risk level of the IoT device with each other and updating the related threat information, based on the update information; and outputting the related threat information managed in the managing the threat information and the related threat information.

While a threat analysis apparatus, etc. according to one or more aspects have been described above by way of embodiments, the present disclosure is not limited to such embodiments. Other modifications obtained by applying various changes conceivable by a person skilled in the art to the embodiments and any combinations of the structural elements in different embodiments without departing from the scope of the present disclosure are also included in the scope of one or more aspects.

INDUSTRIAL APPLICABILITY

The present disclosure is applicable to an analysis apparatus that analyzes cyberattacks against vehicles and the like.

What is claimed is:
1. A threat analysis apparatus, comprising:
a processor; and
a memory holding:
update information indicating that function addition to an IoT device is performed, the function addition being an addition of a function to the IoT device;
threat information of a cyberattack;

risk level information defining a risk level of the IoT device; and related threat information associating the IoT device with the risk level;

the memory further including at least one set of instructions that, when executed by the processor causes the processor to perform operations including:

associating the threat information and the risk level of the IoT device with each other and updating the related threat information, when the update information indicates that the function addition to the IoT device has been performed; and outputting the related threat information, the related threat information being the related threat information that has been updated by the processor.

2. The threat analysis apparatus according to claim 1, wherein the IoT device is a mobility device, and
the operations further includes:
exchanging the threat information.

3. The threat analysis apparatus according to claim 2, wherein the risk level is defined for each function relating to mobility control.

4. The threat analysis apparatus according to claim 2, wherein the risk level is defined based on a relationship of an electronic control unit that transmits and receives a mobility control message.

5. The threat analysis apparatus according to claim 2, wherein the risk level is defined according to a total number of authorities corresponding to an application that performs mobility control.

6. The threat analysis apparatus according to claim 2, wherein the related threat information is managed for each vehicle type.

7. The threat analysis apparatus according to claim 2, wherein the related threat information is held for each vehicle.

8. The threat analysis apparatus according to claim 1, wherein, in the updating, the related threat information is updated before completion of the function addition to the IoT device.

9. The threat analysis apparatus according to claim 1, wherein, in the updating, the related threat information is updated after completion of the function addition to a predetermined number of the IoT devices.

10. The threat analysis apparatus according to claim 1, further comprising:
when the related threat information is updated in the updating, transmitting a control signal to a vehicle based on the related threat information updated.

11. A threat analysis method used in an apparatus, the apparatus including a memory that holds:
update information indicating that function addition to an IoT device is performed, the function addition being an addition of a function to an IoT device,
threat information of a cyberattack,
risk level information defining a risk level of the IoT device, and
related threat information associating the IoT device with the risk level,
the threat analysis method comprising:
associating the threat information and the risk level of the IoT device with each other and updating the related threat information, when the update information indicates that the function addition to the IoT device has been performed; and
outputting the related threat information, the related threat information being the related threat information that has been updated.

12. A non-transitory computer-readable recording medium having a program for causing a computer to execute the threat analysis method according to claim 11.

* * * * *